Jan. 5, 1965
CHRISTIAN-MARIE-LUCIEN-LOUIS BOURCIER DE CARBON
3,164,225
SHOCK ABSORBERS HAVING ANNULAR DISC VALVING
Filed July 26, 1962
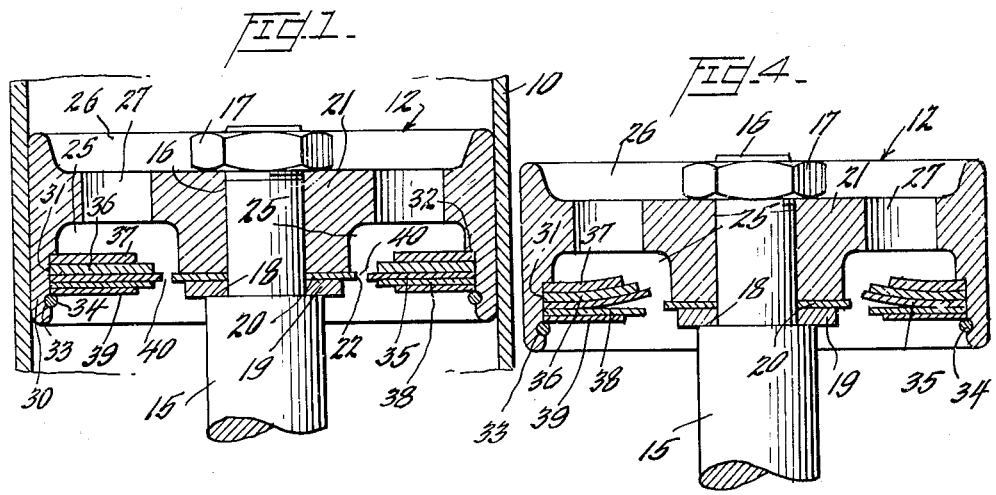
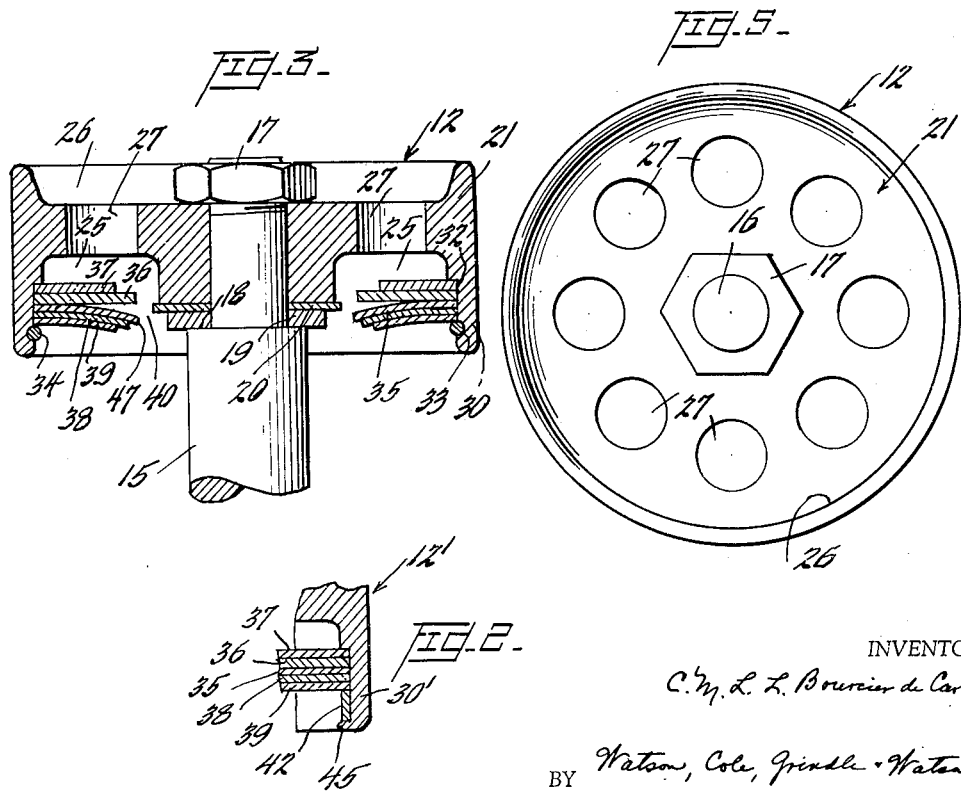
INVENTOR
C. M. L. L. Bourcier de Carbon
BY Watson, Cole, Grindle & Watson
ATTORNEYS

3,164,225
SHOCK ABSORBERS HAVING ANNULAR DISC VALVING
Christian-Marie-Lucien-Louis Bourcier de Carbon, 64 Blvd. Maurice Barres, Neuilly-sur-Seine, France
Filed July 26, 1962, Ser. No. 212,589
Claims priority, application France, Sept. 6, 1961, 872,483, Patent 1,307,945
4 Claims. (Cl. 188—100)

This invention relates to shock absorbers and more particularly to shock absorbers of the reciprocating direct-acting, piston-and-cylinder type, and has to do primarily with the piston valving.

The general object of the invention is to provide a novel and improved valve system for shock absorber pistons, in which the control of the flow of the damping fluid is more precise and this without increasing the liability of the valve parts to fatigue and fracture.

The invention in its preferred embodiments contemplates the provision of a piston having an annular cavity in one or the other of its faces, and a plurality of free openings or passageways leading from the bottom of said cavity through the opposite face of the piston. The inner wall of tis cavity is formed with, or is furnished with an annular disc which provides, a thin circular edge extending radially outwardly from the axis of the piston, to provide the inner margin of an annular slit of variable width which constitutes the control opening or passageway for the damped flow of liquid through the piston from one side to the other during compression and extension strokes.

The other margin of the annular slit is constituted by the inner circular edge of one or more annular valve discs preferably a plurality which are held against axial movement at their outer edges—but not encased, embedded, nor gripped rigidly—by means carried by the outer wall of said cavity.

The central disc is preferably positioned in the same plane as the means constituting the inner edge of the annular slit or opening; and its inner diameter is such that a minimal slit width is predetermined when the central disc is undeformed or in repose.

Th supplemental discs may also be made in differing thicknesses, to attain certain desired results as will be described presently.

The arrangement is such that the pressure of the damping fluid, upon movement of the piston in either direction, serves to flex the radially inner portions of the central disc together with the supplemental discs upon the remote side thereof away from the original planar position of repose, and thus to regulate the flow and consequently the damping effected by the shock absorber.

Other objects and features of novelty will be apparent from the following specification when read in connection with the accompanying drawings in which certain embodiments of the invention are illustrated by example, and those novel features will be summarized at the end of the specification.

In the drawings:

FIGURE 1 is a fragmentary view in vertical section of a shock absorber embodying the principles of the invention, the valve discs being in repose as during the time the vehicle is not traveling or during level boulevard riding;

FIGURE 2 is a fragmentary detail view through one edge portion of the piston showing an alternative means for retaining the discs;

FIGURE 3 is a view of the piston similar to FIGURE 1 but showing the bending or flexing of portions of the discs upon movement in the compression direction;

FIGURE 4 is a similar view illustrating the action upon movement of the piston in the extension or rebound direction; and FIGURE 5 is a top plan view of the piston.

For an over-all illustration of the type of shock absorbe to which the present invention may be applied, referenc is made to a number of prior patents granted to the pre ent applicant, some of which are mentioned below, an therefore there need only be illustrated in the presen application the portions of the entire installation whic embody the novelty of the invention. Thus, in FIGURE the shock absorber cylinder or casing is indicated at 1 and the piston is given the general designation 12. Th piston rod 15 has an attenuated terminal portion 16 t the threaded end of which a retaining nut 17 is screwe Against the shoulder 18 formed between the portions 1 and 16 of the piston, is seated a washer 19 which grips thin disc 20 between itself and the main block casting 2 comprising the major portion of the piston 12. Th peripheral margins 22 of the disc 20 provide the inne edges of a slit 40 which constitutes the controlled annula passageway through the piston.

Formed within the underside of the piston casting 2 in this illustrative embodiment is the large annular cavit 25, this cavity being in communication with the dishe upper face 26 of the piston by means of an annular seri of openings 27.

Although the large valve-receiving annular cavity 2 in the illustrated embodiment of the invention is forme on the underside of the piston, the situation could we be reversed if desired and the cavity formed in the upp face of the piston.

The outer wall 30 of the piston cavity 25 is provide with a smooth cylindrical recess 31 bounded upon th upper side by a very narrow shoulder 32. An annula groove 33 of substantially semi-circular cross-section formed in the inner face of the wall of the cavity and adapted to receive a split snap ring or circlip 34 of circi lar cross-section. Between the circlip 34 and the narro shoulder 32 there are fitted a series of annular, thi metallic valve discs 35, 36, 37, 38 and 39. The centr valve disc 35 is positioned substantially co-planar with th inwardly disposed disc 22 and thus the discs 35 and 2 define the initial thin annular slit 40 which always r mains open for the passage of the small amount of damp ing liquid which would occur during smooth boulevar riding, where additional strong throttling of the flow not needed nor desired.

An alternative form of retaining means for the disc is shown in FIGURE 2 of the drawings and this con prises a short tubular element 42 having a force fit withi the skirt or annular wall 30' of the piston 12'. The r tention of the tubular element 42 may be aided by the ir ward spinning or swaging of the end portion of the ski 30' as at 45.

In any event, however, the outer peripheries of the disc 35–39 are not strongly clamped, encased, or embedde with respect to the pison casting 21 but are allowed a gre freedom of flexing and possibly some slight relative sli ing movement resulting from the flexing, during the o eration of the shock absorber.

Now upon the occurrence of the compression stro! of the piston, which of course means movement there in the upward direction as shown in FIGURE 3 of th drawings, the damping liquid is forced downward through the openings 27 and into the upper portion the cavity 25 and exerts pressure upon the inner ma ginal lip 47 of the central disc 35 which flexes this inn portion of the disc away from registry with the perip ery 22 of the inner stationary disc 20 and thus wide the annular flow opening or slit 40 to permit more dam ing liquid to pass. It will be noted that in this dow ward flexing of the central disc 35 the graduated su plemental discs 38 and 39 are also flexed downward these discs add increasing resistance to the flexing  
he group of discs during this stroke.  
owever, the discs 38 and 39 are by preference some-  
t thinner than the discs 36 and 37 upon the upper  
of the central disc 35.  
t this downward or extension movement of the piston  
n FIGURE 4 of the drawings, the central disc 35  
exed upwardly away from its position of repose co-  
ar with the disc 20 and also results in the flexing  
he superposed discs 36 and 37 upwardly and these  
s being thicker than the lower supplemental discs  
nd 39 afford a greater resistance to upward or  
nsion flexure of the central disc 35.  
hus, the supplemental discs upon either side of the  
ral disc 35 are flexed only upon alternate move-  
ts of the piston and therefore are subjected to much  
fatigue than if they were flexed continually.  
n the one hnad, this very gradual valve action, and  
he other hand, the inherent elasticity of the foil discs  
ointed out in relation to the relaxation effect de-  
ed in the applicant's French Patent No. 936,178 for  
filtering of high frequencies, make it possible to  
in with the present piston element a remarkably  
oth ride. In attaining the differential effect between  
compression damping and the extension or rebound  
ping afforded by the novel shock absorber, a sug-  
ed range of thicknesses of the disc, for most passen-  
cars, would be approximately within the following  
ts:

|  | Millimeters |
|---|---|
| discs 36 and 37 | 0.7–1.4 |
| disc 35 | 0.20–0.30 |
| discs 38 and 39 | 0.30–0.60 |
| the inner marginal disc 20 | 0.15–0.25 | to the slit 40 it may, in the position of rest of the  
k absorber, have a width of between 0.15 and 0.3  
imeter.  
lso, in order to increase as much as possible the  
tance to fatigue, the disc 37 will preferably have a  
cness slightly greater than that of the disc 36, and  
larly the disc 39 will preferably have a thickness  
itly greater than that of disc 38, that is to say, the  
cnesses will increase from the central control disc 35  
ard the end discs 37 and 39.  
lso, by preference, the inside diameter of the central  
rol disc 35 will be closed to one-half of its outside  
eter, or in any event, less than one-half of the di-  
ter of the piston.  
will be borne in mind that the drawings are not  
uted strictly to scale, and the discs are shown con-  
rably thicker than they would be in actual practice.  
here are already known, as suggested in my French  
nts 948,067 and 968,231, shock absorbers in which  
control passageways of the damping liquid take place  
ig a thin slit concentric to the axis of the piston.  
re are also already known, as in my French patents  
addition 56,846 and 58,079, and French Patents  
,271, 968,231 and 1,073,454, shock absorbers in which  
circular slit has as its inner wall the outer edge of  
or more flexible circular discs so as to produce a  
lually opening valve mechanism somewhat similar to  
described above.  
hese last mentioned devices due to the very gradual  
ing action of the flexible circular discs and due to  
r inherent elasticity, make it possible—as in the pres-  
device and for the same reasons—to obtain a smooth  
. However, they have serious drawbacks which up  
ow have prevented their wide use in actual practice.  
a matter of fact, in the case of a central support of  
ll diameter, on the one hand, the fatigue imposed  
n the flexible blades is considerable, while on the  
r hand, as soon as the force reaches a certain value  
e is risk of the flexible discs buckling; that is to say,  
non-uniform deformation of the outer edges taking  
e suddenly. These two effects lead in practice to the rapid fracture of the discs. Finally, and in particular in all of the prior devices there are always concerned discs which have their edges held or gripped firmly. That is to say, they are installed with a fixed edge which affords only the possibility of relatively slight deflections which would not in the present case permit sufficient opening of the circular slit 40, and which in practice would make it impossible to obtain simultaneously the necessary flexing of the discs and their resistance to rupture by fatigue, particularly since in all of these prior devices all of the discs of the pack being of the same diameter, they are necessarily subjected to deformations in both directions which considerably increases the fatigue effect.

In summary, it may be stated that for a number of reasons which exert a favorable influence, the present device is quite superior to the previous ones mentioned and permits the production and utilization of practical embodiments without risk of breaking of the discs. These reasons, which individually or in combination, constitute the principal inventive features of the present device, are as follows:

(a) In the case of the supporting of the discs at their outer edges, the fatigue of the discs is substantially less as may be proved by the theory of circular plates.

(b) In the case of the support of the discs at the outer edge there is no longer any danger of buckling.

(c) Due to the differences of inside diameters, only the relatively thin control disc 35 is forced to bend in both directions from its equilibrium position, while the true supporting or backing-up discs 36, 37, 38 and 39 need only bend in one direction. These latter discs, due to their greater thickness, would be subjected to the greater fatigue, were they flexed during each movement of the piston.

(d) Finally, in the present device since the discs are held only by simple support of their outer edges without the edges being clamped in position, the flexure of the discs to a sufficient degree is readily attained, despite the use of thicker discs which are able to suitably withstand the forces imposed upon them. This last named feature is very important and is one of the essential features of the present invention. The theory of deformation of circular plates indicates a greater aptitude for deformation when the plates are simply supported at their edges without the edges being clamped tightly or otherwise fixed in position. Thus, this principle is applicable to other installations as, for example, in my prior patents mentioned above where the discs are fastened at their inner edges and are flexed at their outer edges.

Finally, there is another important reason for the superiority of the present device over the devices previously known and this may be explained as follows. In the case of the previous devices in which flow takes place around the outer edge of a disc of rather large diameter, the slightest defect in the longitudinal position of the pack of discs may result in a considerable variation in the total cross-section of the passageway in different phases of operation; that is to say, the apparatus manufactured in that manner will vary greatly in its properties. On the other hand, with the present device, since the perimeter of the slit 40 is much smaller, this defect need not be of great concern. It results from this that for the same degree of precision in manufacture, the device manufactured in accordance with the present invention will have more precise characteristics.

It may also be added that since the resistance to displacement of the piston is proportional to the square of the total cross-section of the passageway resulting from the bending of the discs, and since the present arrangement makes it possible to reduce the perimeter of the opening by about one-half, the variations resulting from the above indicated causes are automatically divided by four, which is a considerable advantage.

It is understood that various changes and modifications may be made in the embodiments illustrated and described herein without departing from the scope of the invention as defined by the following claims.

Having thus described the invention, what is claimed as new and desired to be obtained by Letters Patent is:

1. In a direct-acting piston-and-cylinder shock absorber, a cylinder containing damping fluid, a piston disposed for reciprocation therein, means in said piston defining an annular slit of variable width and concentric with the axis of the piston for the controlled passage of damping fluid from one side of the piston to the other, said means comprising a fixed circular edge providing one margin of said slit, and a stack of flexible annular valve discs normally lying flat in contact with each other substantially throughout their areas and having inner and outer completely circular edges, means fixedly carried by said piston for supporting said stack of discs by contact top and bottom with one of its circular edges, said contact being along a narrow line at the extreme edges of said stack so as to avoid gripping, clamping, or encasement of the edges of the stack, the other circular edge comprising the other margin of said slit and adapted to flex in at least one direction upon being subjected to force of damping fluid upon movement of said piston at a predetermined rate, to vary the effective passageway afforded by said slit, said stack of discs being supported at its outer peripheral edge and the flexure for varying the size of the slit occurring at the inner edge, said fixed circular inner edge of the slit being comprised by a radially projecting thin plate, and said stack of valve discs comprising at least three thin discs the central one in repose being substantially co-planar with said thin plate and having its inner circular edge surrounding and in close proximity to the edge of said plate to provide the annular slit of extremely narrow dimensions, the inner edge portion of said central valve disc extending radially inwardly somewhat farther than those of the adjacent discs, whereby pressure of fluid in one axial direction causes the inward portions of the central disc to flex away from the initial plane of the plate to open the slit to a degree depending upon the pressure of said fluid and also to flex the other valve disc on one side of the central disc, and pressure of fluid in the opposite axial direction causing the central disc to flex in the other direction and causing similar flexure of the adjacent valve disc on the other side of the central disc.

2. The shock absorber as set forth in claim 1 in which there are five thin annular discs in the stack of valve discs and in which there are provided two supplemental discs upon each side of the central disc having inner edges of graduated extent and backing up the central disc in each of its two directions of movement.

3. The shock absorber as set forth in claim 2 in which the two supplemental discs are of various thicknesses selected in accordance with the resistance to flow desired.

4. A fluid pressure device comprising a cylinder containing fluid and a piston disposed for reciprocating movement therein, and valve means carried by said piston and adapted to open to various degrees for the passage of fluid through the piston according to the pressure of fluid to which the valve means is subjected, said valve means comprising an annular cavity in one end surface of said piston through which fluid must pass in flowing from one side of the piston to the other, at least one thin flexible annular valve disc having its outer circular edge in axial abutment with a portion of the outer wall of said cavity and having its inner circular edge surrounding and disposed adjacent to a projecting circular portion of the inner wall of said cavity and subject to fluid pressure to flex away from said portion to provide a variable annular opening for the controlled passage of fluid, said projection on said inner wall of said cavity comprising the radially outwardly extending edge of a disc rigid with said piston, and the outer edge portions of the valve disc being held between two oppositely facing narrow annular abutments on the outer wall of the cavity, the outer one of said oppositely facing abutments a circlip of circular cross section set in groove of substantially semi-circular cross section in said outer wall surface.

References Cited in the file of this patent
UNITED STATES PATENTS 2,320,697 Binder _____ June 1, 1943
2,821,268 Carbon _____ Jan. 28, 1958

FOREIGN PATENTS 1,133,490 France _____ Nov. 19, 1956
1,244,909 France _____ Sept. 26, 1960